(12) United States Patent
Kim

(10) Patent No.: US 8,450,433 B2
(45) Date of Patent: May 28, 2013

(54) RESIN COMPOSITION FOR MANUFACTURING MARBLE CHIPS, METHOD FOR MANUFACTURING MARBLE CHIPS, AND ARTIFICIAL MARBLE MADE FROM MARBLE CHIPS

(76) Inventor: Young-Min Kim, Seoul (KR)

( * ) Notice: Subject to any disclaimer, the term of this patent is extended or adjusted under 35 U.S.C. 154(b) by 143 days.

(21) Appl. No.: 12/856,542

(22) Filed: Aug. 13, 2010

(65) Prior Publication Data

US 2010/0311867 A1 Dec. 9, 2010

Related U.S. Application Data

(63) Continuation of application No. PCT/KR2009/000943, filed on Feb. 27, 2009.

(30) Foreign Application Priority Data

Feb. 28, 2008 (KR) ........................ 10-2008-0018417

(51) Int. Cl.
*C08K 3/10* (2006.01)
*C08K 5/01* (2006.01)
*C08K 5/07* (2006.01)
*C08L 63/02* (2006.01)

(52) U.S. Cl.
USPC ........... 525/523; 523/427; 523/428; 523/429; 523/453; 523/454; 523/455; 523/457; 523/458; 523/461; 523/462; 523/463; 523/466; 523/467; 525/107; 525/111; 525/113; 525/114; 525/423; 525/438; 525/454; 525/476; 525/485; 525/486; 525/526; 525/527; 525/528; 525/529; 525/531; 525/532

(58) Field of Classification Search
None
See application file for complete search history.

(56) References Cited

U.S. PATENT DOCUMENTS 4,559,395 A * 12/1985 Jackson ........................ 528/102
2006/0135709 A1 * 6/2006 Hasegawa et al. ............. 525/474
2009/0192265 A1 * 7/2009 Hasegawa et al. ............. 525/101

* cited by examiner

*Primary Examiner* — Robert Sellers
(74) *Attorney, Agent, or Firm* — Park & Associates IP Law, P.C.

(57) ABSTRACT

Provided are a resin composition for the manufacture of marble chips including a halogenated epoxy resin binder and showing high heat resistance, high chemical resistance, high impact resistance, high specific gravity and high transparency, a marble chip manufacturing method using the resin composition and an artificial marble made from marble chips.

16 Claims, 2 Drawing Sheets

RESIN COMPOSITION FOR MANUFACTURING MARBLE CHIPS, METHOD FOR MANUFACTURING MARBLE CHIPS, AND ARTIFICIAL MARBLE MADE FROM MARBLE CHIPS

REFERENCE TO RELATED APPLICATIONS

This a continuation of pending International Patent Application PCT/KR2009/000943 filed on Feb. 27, 2009, which designates the United States and claims priority of Korean Patent Applications No. 10-2008-0018417 filed on Feb. 28, 2008, the entire contents of which are incorporated herein by reference.

FIELD OF THE INVENTION

The present invention relates to a resin composition for the manufacture of marble chips capable of realizing the texture of natural marble, a marble chip manufacturing method using the resin composition and an artificial marble made from the marble chips. More particularly, the present invention is directed to a resin composition for the manufacture of marble chips including a halogenated epoxy resin binder and showing high heat resistance, high chemical resistance, high impact resistance, high specific gravity and high transparency, a marble chip manufacturing method using the resin composition and an artificial marble made from marble chips.

BACKGROUND OF THE INVENTION

Pursuant to a demand for high-class pleasant houses, a natural marble is recently spotlighted as a building material. Despite the high surface hardness and graceful texture thereof, the natural marble fails to be popularized because it is high-priced, heavyweight and weak in impact resistance.

In contrast, an artificial marble developed as an alternative to the natural marble is capable of realizing many different patterns and is quite glossy, highly resistant to severe temperature change, low in moisture absorbency and high in strength. Thus, the artificial marble can provide excellent decoration effects when applied to high-class houses, hotels, apartments and so forth. This leads to a sharp increase in demand over the world.

In general, the artificial marble is produced by mixing a filler material such as natural stone powder or synthetic inorganic material powder with a resin and press-forming the mixture with a vacuum compression press or molding the mixture with a mold. Examples of the filler material include marble chips made from aluminum hydroxide, barium sulfate, magnesium sulfate, barium carbonate, calcium carbonate, silica, granite and other inorganic materials. Examples of the resin include syrup prepared by melting a thermosetting unsaturated polyester resin or a thermoplastic polymethyl methacrylate (PMMA) resin in methylmethacrylate monomers.

In order for the artificial marble to have many different colors and patterns, the marble chips are produced by adding pigments or other additives to a resin, curing the mixture into a thick plate shape and crushing the plate into chips with different sizes.

The term "artificial marble" refers generally to artificially synthesized products with texture like a natural marble, which is produced by mixing natural stone powder or mineral powder with a resin, such as acryl, unsaturated polyester or epoxy, or a cement and adding pigments and other additives to the mixture. Depending on the kind of the forming method or the kind of matrix, the artificial marble is largely classified into an acryl-based artificial marble, an unsaturated polyester-based artificial marble, an epoxy-based artificial marble and an engineered stone-based artificial marble.

Among them, the engineered stone-based artificial marble is most similar in texture to a natural marble and is made from a main component such as natural stone powder, quartz, glass, mirror or aluminum hydroxide and 15 wt % or less of binder resin. The engineered stone-based artificial marble is similar in color and texture to the natural marble and, therefore, is popularly used as an alternative to the natural marble. However, the engineered stone-based artificial marble has a drawback in that it is high in specific gravity and hard to process. As compared with the acryl-based artificial marble or the unsaturated polyester-based artificial marble, it is hard to use the engineered stone-based artificial marble as a general-purpose building material.

As a solution to this problem, certain artificial marble manufacturers make an attempt to develop marble chips with high specific gravity and high transparency, thereby giving the texture of natural marble to the acryl-based artificial marble.

Korean Patent Laid-open Publication No. 10-2007-0115350 discloses a method of producing multi-layered marble chips by forming an inorganic material layer with high specific gravity on a layer with low specific gravity. The marble chips thus produced are useful as high-specific-gravity marble chips but are incapable of realizing complete transparency.

Korean Patent Registered Publication No. 10-0750514 discloses halogenated epoxy acrylate marble chips superior in transparency and specific gravity. However, the marble chips are weak in impact resistance and likely to become yellowish due to the degradation in the manufacturing process. Since the resin composition for the manufacture of the marble chips contains acrylic acid, it becomes yellowish over time.

SUMMARY OF THE INVENTION

In view of the problems mentioned above, it is an object of the present invention to provide a resin composition for the manufacture of marble chips including a halogenated epoxy resin binder and showing high heat resistance, high chemical resistance, high impact resistance, high specific gravity and high transparency, a marble chip manufacturing method using the resin composition and an artificial marble made from marble chips.

According to one aspect of the present invention, there is provided a resin composition for the manufacture of marble chips including a halogenated epoxy resin binder and showing high heat resistance, high chemical resistance, high impact resistance, high specific gravity and high transparency.

Preferably, the halogenated epoxy resin binder contains 15 to 65% of halogen and has an equivalent of 200 to 7,000 g/eq.

In this regard, the equivalent denotes the value obtained by dividing the average molecular weight of one epoxy molecule chain by the number of epoxy groups per molecule, namely the gram number of resin containing epoxy groups of 1 g equivalent.

The halogenated epoxy resin may be purchased from, e.g., Hexion Specialty Chemicals, Inc. (Bakelite EPR or EPM Series), Kukdo Chemical Co., Ltd., Korea (YDB-400/419/416 or KB-560/562P/563P), or Woojin Polymer Co., Ltd., Korea (CXB-400S Series). The halogenated epoxy resin may be, e.g., bromated bisphenol A type epoxy resin having the following structure:

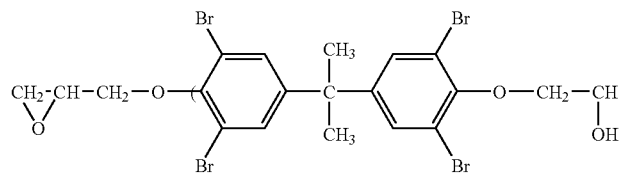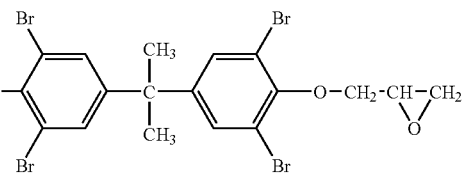

The resin composition may further include a curing agent for increasing the molecular weight of the halogenated epoxy resin.

In this regard, the curing agent may include at least one member selected from the group consisting of polyoxyalkylenepolyamine, polyamidoamine, aliphatic amine, tertiary amine, aromatic aliphatic amine, cycloaliphatic amine, aromatic amine, imidazole, urea, isophorone diamine, dicyandiamide, anhydrides materials, methylethylketone peroxide, benzoyl peroxide and t-butyl peroxide.

The resin composition may further include at least one additive selected from the group consisting of an ultraviolet absorbent, a pigment, a dye, a pearl, a hologram, marble chips, metal chips, a defoaming agent, a silane coupling agent, a curing accelerator, a storage stabilizer, a cross-linking agent and a mixture thereof.

The resin composition may further include at least one member selected from the group consisting of glycidyl ether, a non-halogenated epoxy resin, a specific-gravity-adjusting resin, a solvent and a mixture of reactive monomers and reactive resins. More specifically, 1 to 5 weight parts of the glycidyl ether, 1 to 50 weight parts of the non-halogenated epoxy resin, 1 to 50 weight parts of the specific-gravity-adjusting resin, 1 to 50 weight parts of the solvent and 1 to 50 weight parts of the mixture of reactive monomers and reactive resins may be added on the basis of 100 weight parts of the halogenated epoxy resin binder. Depending on the viscosity of the matrix material, the composition ratio may be changed to thereby obtain transparent marble chips of different specific gravities. This makes it possible to use the marble chips regardless of the casting conditions.

Although the halogenated epoxy resin binder has a specific gravity of about 1.80 to 1.85, the specific gravity of the marble chips is typically in the range of from 1.45 to 1.75 and varies with the size of the marble chips and the viscosity of the matrix material.

More specifically, the specific gravity of the marble chips needs to be high if the matrix material has an increased viscosity. In contrast, the specific gravity of the marble chips needs to be low if the matrix material has a reduced viscosity.

In view of this, the content of the halogenated epoxy resin binder is increased when producing high-specific-gravity marble chips. In order to produce marble chips of low specific gravity, e.g., 1.35 to 1.75, glycidyl ether or like substance is added to the halogenated epoxy resin binder.

In case of manufacturing an artificial marble, the specific gravity of the marble chips is adjusted in conformity with the desired specific gravity of the artificial marble. This helps prevent occurrence of layer separation in the artificial marble, thereby minimizing color deviation in the artificial marble.

The glycidyl ether may include, as a reactive diluent, at least one member selected from the group consisting of trimethylol propane triglycidyl ether, glycerol polyglycidyl ether, diglycerol polyglycidyl ether, pentaerythritol polyglycidyl ether, castoil glycidyl ether, sorbitol glycidyl ether, 1,4-buthanediol diglycidyl ether, 1,6-hexanediol diglycidyl ether, neopentyl glycol diglycidyl ether, 1,4-cyclohexane dimethanol diglycidyl ether, polypropylene glycol diglycidyl ether, ethylene glycol diglycidyl ether, polyethylene glycol diglycidyl ether, diethylene glycol diglycidyl ether, resorcinol diglycidyl ether, hydrogenated bisphenol A diglycidyl ether, N,N-diglycidyl aniline, N,N-diglycidyl-O-toluidine, triglycidyl-p-aminophenol, tetraglycidyl-diamino diphenyl methane, triglycidyl-isocyanurate, neodecanoic acid glycidyl ether, diglycidyl-1,2-cyclohexane dicarboxylate, diglycidyl-O-phthalate, n-butyl glycidyl ether, aliphatic glycidyl ether (C12-C14), 2-ethylhexyl glycidyl ether, phenyl glycidyl ether, o-cresyl glycidyl ether, nonyl phenyl glycidyl ether, p-tert-butyl phenyl glycidyl ether and a mixture thereof.

The non-halogenated epoxy resin may include at least one member selected from the group consisting of bisphenol A epoxy resin, bisphenol F epoxy resin, o-cresol novolac epoxy resin, phenol-novolac epoxy resin, bisphenol A novolac epoxy resin, rubber-modified (dimer, carboxyl-terminated butadiene-acrylonitrile copolymer ("CTBN"), nitrile-butadiene rubber ("NBR") or acryl rubber-modified) epoxy resin, urethane-modified epoxy resin, polyol-modified epoxy resin, multifunctional epoxy resin, trimethylol propane type epoxy resin and UV-cured epoxy resin.

The specific-gravity-adjusting resin may include at least one member selected from the group consisting of unsaturated polyester (alkyd), saturated polyester, epoxy acrylate, urethane acrylate, melamine acrylate, silicon acrylate, phenoxy resin, polyurethane, acryl resin, halogenated urethane acrylate and isocyanate resin.

The solvent may include at least one member selected from the group consisting of 1,2-dichloroethane, 1,2-dichloroethylene (dichloroacetylene), carbon tetrachloride, carbon disulfide, 1,1,2,2-tetrachloroethane (tetrachloroacetylene), chloroform, trichloroethylene, normal hexane, 1,4-dioxane, dichloromethane (dichloromethylene), methanol, methylcyclohexanone, methylcyclohexanol, cyclohexanol, styrene, acetone, ethylene glycol monomethyl ether (methyl cellosolve), butyl acetate, isobutyl acetate, isopentyl acetate (isoamyl acetate), isopropyl acetate, pentyl acetate (amyl acetate), propyl acetate, cresol, chlorobenzene, xylene, tetrachloroethylene (perchloroethylene), tetrahydrofuran, toluene, 1,1,1-trichloroethane, ethylene glycol monomethyl ether (cellosolve), ethylene glycol monomethyl ether acetate (cellosolve acetate), ethyl ether, ethylene glycol monobutyl ether (butyl cellosolve), N N-dimethylformamide, ortho-dichlorobenzene, isobutyl alcohol, isopentyl alcohol (isoamyl alcohol), isopropyl alcohol, methyl acetate and ethyl acetate.

The mixture of reactive monomers and reactive resins may include at least one member selected from the group consisting of vinyl ester, acryl resin, acrylonitrile ("AN"), methyl methacrylate ("MMA"), styrene monomer ("SM"), n-butyl acrylate ("NBA") and butyl methacrylate ("BMA").

According to another aspect of the present invention, there is provided a method for manufacturing high-specific-gravity marble chips, comprising the steps of: heating and melting a halogenated epoxy resin binder containing 15 to 65% of halogen and having an equivalent of 200 to 7,000 g/eq; mixing a curing agent with the epoxy resin binder to obtain a mixture; curing the mixture into a cured product; and cooling and crushing the cured product into marble chips.

If a solid halogenated epoxy resin is used in the marble chip manufacturing method, the epoxy resin is heated to a softening point thereof or more to melt the same.

The curing agent used in the marble chip manufacturing method may be a liquid curing agent having a specific gravity of from 0.85 to 0.99. In order to produce marble chips having a specific gravity of, e.g., from 1.70 to 1.75, about 10 to 15 wt % of curing agent is added on the basis of the total weight of the resin composition. In this regard, the curing agent may include at least one member selected from the group consisting of polyoxylalkylenepolyamine, polyamide, amidoamine, aliphatic amine, tertiary amine, aromatic aliphatic amine, cycloaliphatic amine, aromatic amine, imidasole, urea, isophorone diamine, dicyandiamide, anhydrous materials, methylethylketone peroxide, benzoyl peroxide and t-butyl peroxide.

The curing step may be performed at a temperature of from 50° C. to 150° C.

Prior to the mixing step, at least one additive selected from the group consisting of an ultraviolet absorbent, a pigment, a dye, a pearl, a hologram, marble chips, metal chips, a defoaming agent, a silane coupling agent, a curing accelerator, a storage stabilizer, a cross-linking agent and a mixture thereof may be added to the epoxy resin binder.

Moreover, prior to the mixing step, at least one member selected from the group consisting of glycidyl ether, a non-halogenated epoxy resin, a specific-gravity-adjusting resin, a solvent and a mixture of reactive monomers and reactive resins may be added to the epoxy resin binder. The ratio and examples of the additives are the same as set forth above.

The marble chip manufacturing method may further include the step of coating the marble chips with inorganic filler using a resin colored by a coloring agent, the marble chips being crushed into a size of from 0.1 mm to 20 mm.

In this regard, the colored resin serves as an adhesive agent and may include at least one member selected from the group consisting of halogenated epoxy resin, acryl resin (syrup), unsaturated polyester resin, unsaturated ester resin, non-halogenated epoxy resin, epoxy acrylate, urethane acrylate, melamine acrylate, silicon acrylate, polyurethane, halogenated urethane acrylate and isocyanate resin. The coloring agent may include at least one member selected from the group consisting of a pigment, a dye, a pearl, a hologram, marble chips and metal chips. The inorganic filler may include at least one member selected from the group consisting of barium sulfate, aluminum hydroxide, magnesium sulfate, silica, glass frits, marble chips and metal chips. Use of barium sulfate having a specific gravity of 4.449 is preferable to increase the specific gravity of the transparent marble chips.

According to a further aspect of the present invention, there is provided an artificial marble made from the marble chips produced using the afore-mentioned resin composition.

ADVANTAGEOUS EFFECTS

As set forth above, the present resin composition for the manufacture of marble chips and the cured product (resin plate for marble chips) obtained by the present method are less likely to become yellowish by degradation or ultraviolet rays and are superior in chemical resistance and particularly in specific gravity. This helps suppress separation of the upper and lower layers in the process of manufacturing the artificial marble, which makes it possible to produce an artificial marble with uniform chip distribution.

In addition, the present resin composition exhibits a superior thermal processing property and keeps high the bonding force between the marble chips and the matrix material in a thermal working process, which helps prevent the marble chips from protruding outwards or being separated from the matrix material. This makes it possible to produce marble chips superior in chemical resistance and thermal processing property and an artificial marble made from the marble chips.

DETAILED DESCRIPTION OF THE INVENTION

Figure 1:
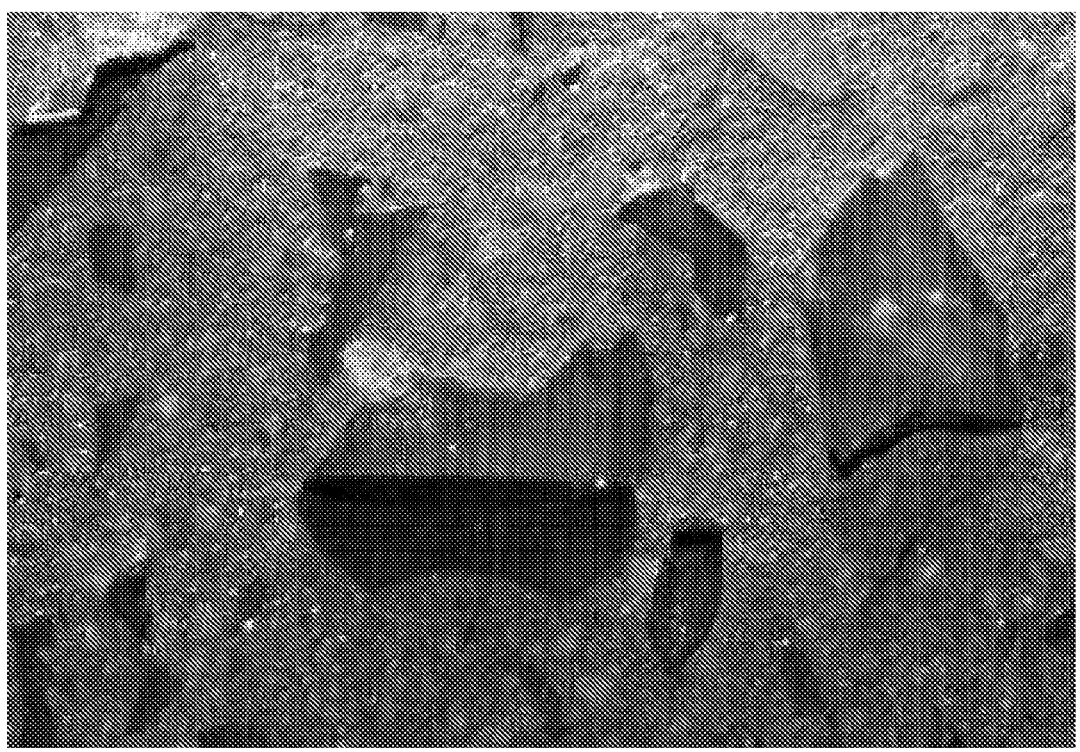
FIG. 1 is a photograph showing an artificial marble made from a conventional resin composition for marble chips.

A marble chip manufacturing method using the present resin composition will now be described in detail.

Production of Transparent Marble Chips 10 to 30 weight parts of typical liquid-phase bisphenol A type epoxy resin binder having low specific gravity (of, e.g., 1.32) is mixed with 60 to 80 weight parts of halogenated epoxy resin binder having high specific gravity (of, e.g., 1.80). The mixture is heated and melted at a temperature of, e.g., 130° C. and then cooled to a temperature of, e.g., 80° C. Then, 2 to 8 weight parts of glycidyl ether as a diluent and 2 to 8 weight parts of solvent are added to and mixed with the molten mixture.

In order to endow the resin mixture with the properties required in the present resin composition, 0.2 weight parts of ultraviolet absorbent, 0.1 weight parts of pigment, 0.1 weight parts of dye, 0.2 weight parts of defoaming agent, 1 weight parts of silane coupling agent, 2 weight parts of curing accelerator and 0.2 weight parts of storage stabilizer are mixed with the resin mixture. Then, 20 to 25 weight parts of curing agent such as amine or amide is added to and mixed with the resin mixture.

After adding the additives and the curing agent as above, the resin mixture is heated at a temperature of from 50° C. to 150° C. As a result, the resin mixture is completely cured into a cured product (or a resin plate for marble chips).

The cured product (or a resin plate for marble chips) is crushed into highly transparent marble chips of 0.1 to 20 mm in size and 1.45 to 1.75 in specific gravity.

Example 1

100 weight parts of halogenated epoxy resin binder (YDB-400 made by Kukdo Chemical Co., Ltd., Korea) was put into a reactor provided with a stirrer, a thermometer and a nitrogen supply device. The reactor was heated up to 130° C. while stirring the epoxy resin binder. After the epoxy resin binder is completely melted, 0.005 weight parts of hydroquinone monomethylether as a polymerization inhibitor for preventing inter-epoxy bond was put into the reactor and completely dispersed to prepare a liquid resin mixture.

In order to improve the properties of the liquid resin mixture thus prepared, 0.4 weight parts of defoaming agent (BYK-066N made by BYK-Chemie Gmbh, Germany), 0.002 weight parts of ultraviolet stabilizer (UA-1000 made by Nonochemtech Co., Ltd., Korea), 0.000008 weight parts of color adjusting agent (PLAMAX Violet 70 made by Dongyang Chemical Co., Ltd., Korea) and 1 weight parts of silane coupling agent (KBM-503 made by Korea Shinetsu Co., Ltd.)

were added to and mixed with 100 weight parts of the liquid resin mixture to thereby prepare a resin composition.

10 weight parts of polyoxylalkylenepolyamine curing agent (Jeffamine D-230 made by Huntsman Corp.) having an average kinetic viscosity of 10 cSt and 5 weight parts of isophorone diamine (CAS No. 2855-13-2 made by BASF Corp., having a molecular weight of 170.3) were mixed with the resin composition. Defoaming was carried out for about three minutes with a vacuum defoaming device to remove air bubbles present in the resin composition. Then, the resin composition was filled in a mold having a specified size and heated at a temperature of from 50° C. to 150° C., thereby producing a cured product (i.e., a resin plate for marble chips).

Example 2

94 weight parts of halogenated epoxy resin binder (CXB-400S made by Woojin Polymer Co., Ltd., Korea) and 4 weight parts of typical bisphenol A type epoxy resin binder (YD-128 made by Kukdo Chemical Co., Ltd., Korea) were put into a reactor (of the same type as used in Example 1) provided with a stirrer, a thermometer and a nitrogen supply device. The reactor was heated up to 130° C. while stirring the epoxy resin binders. After the epoxy resin binders are completely melted, 0.005 weight parts of hydroquinone monomethylether as a polymerization inhibitor for preventing inter-epoxy bond was put into the reactor and completely dispersed. The reactor was cooled down to 80° C., after which 2 weight parts of unsaturated polyester (TP-145 made by Aekyung Chemical Co., Ltd., Korea) was put into the reactor to dilute the mixture.

In order to improve the properties of the liquid resin mixture thus prepared, 0.4 weight parts of defoaming agent (BYK-066N made by BYK-Chemie Gmbh, Germany), 0.002 weight parts of ultraviolet stabilizer (UA-1000 made by Nonochemtech Co., Ltd., Korea), 0.000008 weight parts of color adjusting agent (PLAMAX Violet 70 made by Dongyang Chemical Co., Ltd., Korea) and 1 weight parts of silane coupling agent (KBM-503 made by Korea Shinetsu Co., Ltd., Korea) were added to and mixed with 100 weight parts of the liquid resin mixture to thereby prepare a resin composition.

10 weight parts of amine curing agent (Jeffamine D-230 made by Huntsman Corp.) having an average kinetic viscosity of 10 cSt and 5 weight parts of isophorone diamine (made by BASF Corp.) were mixed with the resin composition. Defoaming was carried out for about three minutes with a vacuum defoaming device to remove air bubbles present in the resin composition. Then, the resin composition was filled in a mold (of the same type as used in Example 1) having a specified size and heated at a temperature of from 50° C. to 130° C., thereby producing a cured product (i.e., a resin plate for marble chips).

Example 3

91 weight parts of halogenated epoxy resin binder (DER-560 made by Dow Chemical Company) and 4 weight parts of typical bisphenol A type epoxy resin binder (Epon-828 made by Hexion Specialty Chemicals; Inc.) were put into a reactor (of the same type as used in Example 1) provided with a stirrer, a thermometer and a nitrogen supply device. The reactor was heated up to 130° C. while stirring the epoxy resin binders. After the epoxy resin binders are completely melted, 0.005 weight parts of hydroquinone monomethylether as a polymerization inhibitor for preventing inter-epoxy bond was put into the reactor and completely dispersed. As in Example 2, the reactor was cooled down to 80° C., after which 1.995 weight parts of toluene, 1 weight parts of methyl ether ketone, 1 weight parts of vinyl ester (DION-9300 made by Aekyung Chemical Co., Ltd., Korea) and 1 weight parts of polypropylene glycol diglycidyl ether (PLUG 1C-207P made by Kukdo Chemical Co., Ltd., Korea) were put into the reactor.

In order to endow the resin mixture with desired physical properties, the same additives as used in Example 2 were added to the resin mixture, thus preparing a resin composition. A cured product (i.e., a resin plate for marble chips) was produced by subjecting the resin composition to the same processing as in Example 2.

Example 4

90 weight parts of halogenated epoxy resin binder (EPR-523 made by Hexion Specialty Chemicals, Inc.) and 4 weight parts of typical bisphenol A type epoxy resin binder (YD-128 made by Kukdo Chemical Co., Ltd., Korea) were put into a reactor provided with a stirrer, a thermometer and a nitrogen supply device. The reactor was heated up to 130° C. while stirring the epoxy resin binders. After the epoxy resin binders are completely melted, 0.005 weight parts of hydroquinone monomethylether as a polymerization inhibitor for preventing inter-epoxy bond was put into the reactor and completely dispersed. As in Example 1, the reactor was cooled down to 80° C., after which 1.5 weight parts of trimethylol propane triglycidyl ether (TMPTGE made by Miwon Commercial Co., Ltd., Korea), 1.995 weight parts of toluene and 2.5 weight parts of unsaturated polyester (TP-145 made by Aekyung Chemical Co., Ltd., Korea) were put into the reactor to dilute the resin mixture.

In order to endow the resin mixture with desired physical properties, the same additives as used in Example 2 were added to the resin mixture, thus preparing a resin composition.

15 weight parts of amine curing agent (EPIKURE 3300 made by Hexion Specialty Chemicals, Inc.) having an average viscosity of 16 cps and 1 weight parts of inorganic peroxide (tertiary butyl peroxide made by Akzo Nobel N.V.) were added to the resin composition. The resin composition was cured for thirty minutes at 95° C. to thereby produce a cured product (i.e., a resin plate for marble chips).

Comparative Example 1

48.8 weight parts of halogenated bisphenol A type epoxy resin binder was put into a four-port flask reactor of 5 L in capacity provided with a stirrer, a nitrogen inlet, a thermometer, a dripping device and a cooling condenser. The reactor was heated up to 90° C. to completely melt the epoxy resin binder. Then, 0.005 weight parts of hydroquinone monomethylether was put into the reactor to prevent inter-epoxy reaction. Thereafter, 51.2 weight parts of methacrylic acid diluted with 1.2 weight parts of benzyl dimethylamine was dripped into the reactor for two hours by use of the dripping device to cause amate reaction. When the reaction rate of the methacrylic acid became 95% or more, the resin mixture was cooled down to 80° C. Thereafter, 17.6 weight parts of methylmethacrylate monomers added with 0.001 weight parts of p-TBC (4-tert-buthylcatechol) was put into the reactor to dilute the resin mixture, thereby preparing a comparative resin composition.

0.7 weight parts of benzoyl peroxide was mixed with 100 weight parts of the resin composition thus produced. The mixture was cured for one hour at 60° C., thus producing a cured product (i.e., a resin plate for marble chips).

The comparison results of physical properties of the cured products (i.e., the resin plates for marble chips) produced in Examples 1 through 4 and Comparative Example 1 are shown in Table 1.

TABLE 1

| Test Items | Examples | | | | Comparative Example 1 |
|---|---|---|---|---|---|
| | 1 | 2 | 3 | 4 | |
| Specific Gravity (g/cm$^3$) | 1.72 | 1.64 | 1.61 | 1.59 | 1.65 |
| Thermal Deformation Temperature (° C.) | 117 | 115 | 105 | 98 | 93 |
| Haze Index | 11 | 14 | 15 | 18 | 17 |
| Drop Impact Index (mm) | 520 | 530 | 510 | 505 | 38 |
| Color Change Degree (ΔE) | 2.9 | 2.9 | 3.5 | 3.6 | 3.8 |
| Yellow Index | 10.3 | 13.5 | 13.9 | 14.5 | 24.37 |

The physical properties were evaluated according to the standardized test methods as follows.

1) The specific gravity of the cured product was measured according to the method of KSM 3015.

2) The thermal deformation temperature was measured according to the method of KSM ISO 75-1.

3) The haze index for evaluation of transparency was measured according to the method of KSM ISO 14782.

4) The drop impact index was measured according to the method of KSM 3074 in which a hammer of 820 g in weight is dropped from different heights.

5) The color change degree (ΔE) in an accelerated weather resistance test was measured according to the method of KSM 5982 in which four test cycles are repeated with each cycle lasting for eight hours (ultraviolet rays being irradiated for four hours and condensation being performed for four hours).

6) The yellow index was measured according to the method of KSM 3026.

As can be seen in Table 1, the cured product of Example 1 is far higher in specific gravity than the cured product of the Comparative Example 1. The cured products of Examples 2 through 4 are similar in specific gravity to the cured product of the Comparative Example 1 but are superior in thermal deformation temperature, drop impact index and yellow index to the cured product of the Comparative Example 1.

In other words, the cured products (marble chips) produced in Examples 1 through 4 is higher in thermal deformation temperature than the cured product of Comparative Example 1. Therefore, the bonding force acting between the transparent marble chips and the matrix material is kept high, which assists in preventing protrusion or separation of marble chips in a thermal working process. The marble chips of Examples 1 through 4 are high in drop impact index and superior in impact resistance. In addition, the marble chips of Examples 1 through 4 show low yellow index. Therefore, it is less likely that yellowing occurs in the course of producing the marble chips and that the color is changed over time. This means that the marble chips are quite suitable for use as a interior decoration material.

Production of High-Specific-Gravity Marble Chips

Example 5

The cured product (resin plate) for transparent marble chips produced in Example 2 was crushed into transparent chips having a size of from 0.1 mm to 20 mm. 2.5 weight parts of colored resin (Hitan resin made by KCC Corp.) and 4 weight parts of inorganic filler (barium sulfate made by Samchun Chemical Co., Ltd., Korea) were mixed with 100 weight parts of the crushed transparent chips. 0.4 weight parts of curing agent (Hitan curing agent made by KCC Corp.) was added to the mixture. The mixture was put into a Hansel mixer and stirred for ten minutes so that the colored resin and the inorganic filler can be coated on the surfaces of the transparent chips. The colored and coated chips were spread out against mutual adherence and heated to 60° C. or more to completely cure the colored resin and the inorganic filler coated on the surfaces of the transparent chips. As a result, it was able to produce beautiful marble chips having a cubic effect and showing specific gravity higher than available before the surface coating.

High-specific-gravity transparent chips having the composition shown in Table 2 were additionally produced in the same manner as set forth above.

TABLE 2

| | Example 5 | |
|---|---|---|
| Item | Kind of Material | Quantity |
| Transparent Chips | As Obtained in Example 2 | 100 |
| Resin | Hitan A-Transparent Liquid | 2.5 |
| Curing Agent | Hitan B-Transparent Liquid | 0.4 |
| Inorganic Material | Barium Sulfate | 4 |
| Coloring Agent | MERK-Silver Pearl 153# | 1.2 |
| Chip Color | Silver | |
| Specific Gravity | 1.75 | |

Production of Artificial Marble from Marble Chips

Examples 6 through 10 and Comparative Example 2

Slurry was prepared by mixing 135 weight parts of aluminum hydroxide, 3.5 weight parts of trimethyl propane trimethacrylate, 0.3 weight parts of normal dodecyl mercaptan, 0.5 weight parts of coupling agent (KBM-503 made by Korea Shinetsu Co., Ltd.), 0.1 weight parts of defoaming agent (BYK-A555 made by BYK-Chemie Gmbh, Germany) and 0.1 weight parts of dispersant (BYK-W909 made by BYK-Chemie Gmbh, Germany) with 100 weight parts of syrup-like resin in which polymethylmethacrylate (IH-830 made by LG MMA Co., Ltd., Korea) is dissolved in methylmethacrylate. The slurry thus prepared and 50 weight parts of marble chips having a size of from 0.1 mm to 4.5 mm obtained by crushing the cured products produced in Examples 1 through 5 and Comparative Example 1 were put into six beakers and stirred. After removing air bubbles, 0.5 weight parts of benzoyl peroxide and 0.5 weight parts of AIBN (azo-bis-iso-butylonitrile) were added to the slurry and stirred once again. The slurry mixture was filled into a mold to have a thickness of 14.5 mm and then heated at a temperature of from 60° C. to 120° C. to cure the same, thus producing a plate-like artificial marble. The upper and lower surfaces of the artificial marble were abraded with sandpapers of #120, 240, 320 and 400, thus obtaining a finished artificial marble.

The chip state, chip distribution, chip sinkage, thermal working property and chemical resistance of the six kinds of artificial marbles were evaluated and shown in Table 3.

TABLE 3

|  | Examples | | | | | |
| --- | --- | --- | --- | --- | --- | --- |
| Test Item | 6 (Chip Of Ex. 1) | 7 (Chip Of Ex. 2) | 8 (Chip Of Ex. 3) | 9 (Chip Of Ex. 4) | 10 (Chip Of Ex. 5) | Comparative Example 2 |
| Thermal Working Property | Good | Good | Good | Good | Good | Cracked |
| Chemical Resistance | Good | Good | Good | Good | Good | Surface Corroded |
| Chip State after Abrading | Good | Good | Good | Good | Good | Good |
| Chip Sinkage Distribution | Good | Good | Good | Not Good | Good | Good |

1) Test of Thermal Working Property: The artificial marble plates of 12.5 mm in thickness were preheated for thirty five minutes at 175° C. and subjected to a 180R bending work. Visual observation was conducted to see occurrence of protrusion or crack of the marble chips contained in the artificial marble plates.

2) Test of Chemical Resistance: One half of each of the specimens was dipped for thirty minutes into a solution of acetone (100%) and a solution of methanol (100%). After wiping out the surfaces of the specimens, visual observation was conducted to see surface corrosion.

3) Test of Chip State after Abrading: The artificial marble plates were dry-abraded with a sandpaper of #600. Visual observation was conducted to determine the outward appearance state of the marble chips contained in the artificial marble plates.

4) Test of Chip Sinkage distribution: The artificial marble plates made from the transparent marble chips produced in Examples 6 through 10 and Comparative Example 2 were cut to visually evaluate the degree of sinkage of the marble chips appearing on the cross-sectional surfaces.

As shown in Table 3 and FIG. 1, the artificial marble plate of Comparative Example 2 exhibits good chip sinkage distribution on the surface thereof because the marble chips thereof have high specific gravity. However, the marble chips contained in the artificial marble plate of Comparative Example 2 were severely corroded in the test of chemical resistance. The uncured resin layer remaining in the artificial marble plate was extruded outwards. Severe cracks appeared in the central areas of the marble chips. Due to the reduced bonding force between the marble chips and the matrix material, protrusion and separation from the matrix material remarkably appeared in the marble chips.

Figure 2:
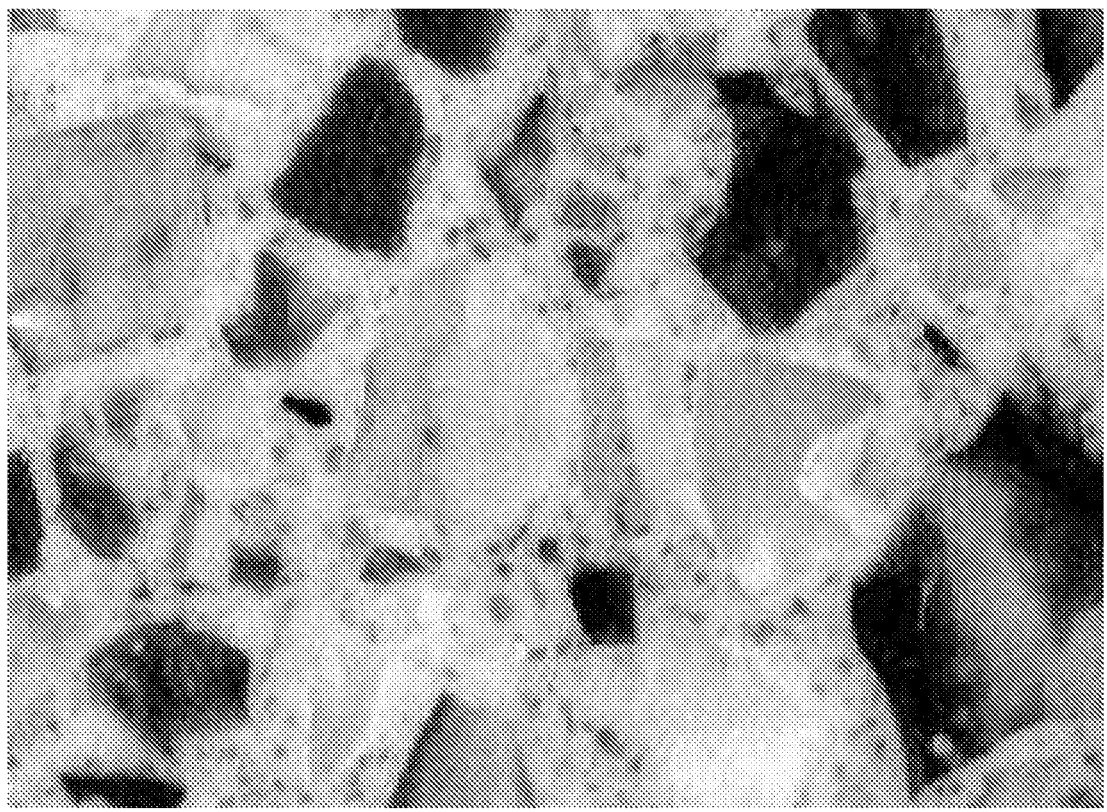
FIG. 2 is a photograph illustrating an artificial marble made from the present resin composition for marble chips.

As shown in Table 3 and FIG. 2, the artificial marble plates of Examples 6 through 10 made from the marble chips of Examples 1 through 5 exhibit good chip sinkage distribution on the surface thereof because the marble chips thereof have high specific gravity. Moreover, the artificial marble plates of Examples 6 through 10 are superior in chemical resistance and thermal working property. Since the bonding force between the marble chips and the matrix material is kept high, protrusion or separation of the marble chips does not occur. In addition, no crack is generated in the marble chips.

While certain embodiments of the present invention have been described above, the present invention is not limited thereto. The present invention may be modified in many different forms without departing from the scope of the invention defined in the claims.

What is claimed is:

1. High specific gravity marble chips prepared by curing a resin composition comprising: brominated bisphenol A epoxy resin binder containing 15 to 65% of bromine and having an epoxy equivalent weight of 200 to 7,000 g/eq; and a curing agent, wherein the curing agent comprises at least one member selected from the group consisting of polyoxylalkylenepolyamine, polyamidoamine, aliphatic amine, tertiary amine, aromatic aliphatic amine, cycloaliphatic amine, aromatic amine, imidazole, urea, isophorone diamine, dicyandiamide, anhydrides, methylethylketone peroxide, benzoyl peroxide and t-butyl peroxide, and wherein the resin composition is cured and crushed into the high specific gravity marble chips having a size ranging from 0.1 mm to 2.0 mm and a specific gravity ranging from 1.45 to 1.75.

2. The high specific gravity marble chips of claim 1, wherein the resin composition as recited in claim 1 further comprises at least one member selected from the group consisting of 1 to 5 weight parts of glycidyl ether added on the basis of 100 weight parts of the brominated bisphenol A epoxy resin binder, 1 to 50 weight parts of a non-halogenated epoxy resin added on the basis of 100 weight parts of the brominated bisphenol A epoxy resin binder, 1 to 50 weight parts of a specific-gravity-adjusting resin added on the basis of 100 weight parts of the brominated bisphenol A epoxy resin binder, 1 to 50 weight parts of a solvent added on the basis of 100 weight parts of the brominated bisphenol A epoxy resin binder, and 1 to 50 weight parts of a mixture of reactive monomers and reactive resins added on the basis of 100 weight parts of the brominated bisphenol A epoxy resin binder.

3. The high specific gravity marble chips of claim 2, wherein the glycidyl ether comprises at least one member selected from the group consisting of trimethylol propane triglycidyl ether, glycerol polyglycidyl ether, diglycerol polyglycidyl ether, pentaerythritol polyglycidyl ether, castor oil glycidyl ether, sorbitol glycidyl ether, 1,4-butanediol diglycidyl ether, 1,6-hexanediol diglycidyl ether, neopentyl glycol diglycidyl ether, 1,4-cyclohexane dimethanol diglycidyl ether, polypropylene glycol diglycidyl ether, ethylene glycol diglycidyl ether, polyethylene glycol diglycidyl ether, diethylene glycol diglycidyl ether, resorcinol diglycidyl ether, hydrogenated bisphenol A diglycidyl ether, N,N-diglycidyl aniline, N,N-diglycidyl-o-toluidine, triglycidyl-p-aminophenol, tetraglycidyl-diamino diphenyl methane, triglycidyl-isocyanurate, neodecanoic acid glycidyl ether, diglycidyl-1,2-cyclohexane dicarboxylate, diglycidyl-o-phthalate, n-butyl glycidyl ether, aliphatic glycidyl ether (C12-C14), 2-ethylhexyl glycidyl ether, phenyl glycidyl ether, o-cresyl glycidyl ether, nonyl phenyl glycidyl ether, p-tert-butyl phenyl glycidyl ether and a mixture thereof, wherein the non-halogenated epoxy resin comprises at least one member selected from the group consisting of bisphenol A epoxy resin, bisphenol F epoxy resin, o-cresol novolac epoxy resin, phenol-novolac epoxy resin, bisphenol A novolac epoxy resin, rubber (dimer, carboxyl-terminated butadiene-acrylonitrile copolymer, nitrile-butadiene rubber or acryl rubber-modified epoxy resin, urethane-modified epoxy resin, polyol-modified epoxy resin, multifunctional epoxy resin, trimethylol propane epoxy resin and UV-cured epoxy resin; wherein the specific-gravity-adjusting resin comprises at least one member selected from the group consisting of unsaturated polyester (alkyd), saturated polyester, epoxy acrylate, urethane acrylate, melamine acrylate, silicon acrylate, phenoxy resin, polyurethane, acryl resin, halogenated urethane acrylate and isocyanate resin; wherein the solvent comprises at least one member selected from the group consisting of 1,2-dichloroethane (dichloroacetylene), carbon tetrachloride, carbon disulfide, 1,1,2,2-tetrachloroethane (tetrachloroacetylene), chloroform, trichloroethylene, normal hexane, 1,4-dioxane, dichloromethane (dichloromethylene), methanol, methylcyclohexanone, methylcyclohexanol, cyclohexanol, styrene, acetone, ethylene glycol monomethyl ether (methyl cellosolve), butyl acetate, isobutyl acetate, isopentyl acetate (isoamyl acetate), isopropyl acetate, pentyl acetate (amyl acetate), propyl acetate, cresol, chlorobenzene, xylene, tetrachloroethylene (perchloroethylene), tetrahydrofuran, toluene, 1,1,1-trichloroethane, ethylene glycol monomethyl ether (cellosolve), ethylene glycol monomethyl ether acetate (cellosolve acetate), ethyl ether, ethylene glycol monobutyl ether (butyl cellosolve), N,N-dimethylformamide, ortho-dichlorobenzene, isobutyl alcohol, isopentyl alcohol (isoamyl alcohol), isopropyl alcohol, methyl acetate and ethyl acetate; and wherein the mixture of reactive monomers and reactive resins comprises at least one member selected from the group consisting of vinyl ester, acryl resin, acrylonitrile, methyl methacrylate, styrene monomer, n-butyl acrylate and butyl methacrylate.

4. The high specific gravity marble chips of claim 3, wherein the resin composition comprises transparent marble chips, wherein the transparent marble chips are prepared by curing and crushing the resin composition comprising the brominated bisphenol A epoxy resin binder and the curing agent.

5. The high specific gravity marble chips of claim 4, wherein the resin composition further comprises at least one inorganic filler selected from the group consisting of barium sulfate, aluminum hydroxide, magnesium sulfate, silica, glass frits, and metal chips.

6. The high specific gravity marble chips of claim 5, wherein the inorganic filler is barium sulfate.

7. The high specific gravity marble chips of claim 6, wherein the resin composition further comprises a colored resin.

8. An artificial marble made from the marble chips produced using the resin composition as recited in claim 7.

9. High specific gravity marble chips prepared by curing a resin composition comprising:
brominated bisphenol A epoxy resin binder containing 15 to 65% of bromine and having an epoxy equivalent weight of 200 to 7,000 g/eq;
a curing agent;
glycidyl ether;
a non-halogenated epoxy resin;
a specific-gravity-adjusting resin;
a solvent; and
a mixture of reactive monomers and reactive resins,
wherein the resin composition is cured and crushed into the high specific gravity marble chips having a size ranging from 0.1 mm to 2.0 mm and a specific gravity ranging from 1.45 to 1.75.

10. The high specific gravity marble chips of claim 9, wherein the resin composition further comprises barium sulfate.

11. The high specific gravity marble chips of claim 10, wherein the curing agent comprises at least one member selected from the group consisting of polyoxylalkylenepolyamine, polyamidoamine, aliphatic amine, tertiary amine, aromatic aliphatic amine, cycloaliphatic amine, aromatic amine, imidazole, urea, isophorone diamine, dicyandiamide, anhydrides, methylethylketone peroxide, benzoyl peroxide and t-butyl peroxide.

12. The high specific gravity marble chips of claim 11, wherein the glycidyl ether comprises at least one member selected from the group consisting of trimethylol propane triglycidyl ether, glycerol polyglycidyl ether, diglycerol polyglycidyl ether, pentaerythritol polyglycidyl ether, castor oil glycidyl ether, sorbitol glycidyl ether, 1,4-butanediol diglycidyl ether, 1,6-hexanediol diglycidyl ether, neopentyl glycol diglycidyl ether, 1,4-cyclohexane dimethanol diglycidyl ether, polypropylene glycol diglycidyl ether, ethylene glycol diglycidyl ether, polyethylene glycol diglycidyl ether, diethylene glycol diglycidyl ether, resorcinol diglycidyl ether, hydrogenated bisphenol A diglycidyl ether, N,N-diglycidyl aniline, N,N-diglycidyl-o-toluidine, triglycidyl-p-aminophenol, tetraglycidyl-diamino diphenyl methane, triglycidyl-isocyanurate, neodecanoic acid glycidyl ether, diglycidyl-1,2-cyclohexane dicarboxylate, diglycidyl-o-phthalate, n-butyl glycidyl ether, aliphatic glycidyl ether (C12-C14), 2-ethylhexyl glycidyl ether, phenyl glycidyl ether, o-cresyl glycidyl ether, nonyl phenyl glycidyl ether, p-tert-butyl phenyl glycidyl ether and a mixture thereof; wherein the non-halogenated epoxy resin comprises at least one member selected from the group consisting of bisphenol A epoxy resin, bisphenol F epoxy resin, o-cresol novolac epoxy resin, phenol-novolac epoxy resin, bisphenol A novolac epoxy resin, rubber (dimer, carboxyl-terminated butadiene-acrylonitrile copolymer, nitrile-butadiene rubber or acryl rubber)-modified epoxy resin, urethane-modified epoxy resin, polyol-modified epoxy resin, multifunctional epoxy resin, trimethylol propane type epoxy resin and UV-cured epoxy resin; wherein the specific-gravity-adjusting resin comprises at least one member selected from the group consisting of unsaturated polyester (alkyd), saturated polyester, epoxy acrylate, urethane acrylate, melamine acrylate, silicon acrylate, phenoxy resin, polyurethane, acryl resin, halogenated urethane acrylate and isocyanate resin; wherein the solvent comprises at least one member selected from the group consisting of 1,2-dichloroethane (dichloroacetylene), carbon tetrachloride, carbon disulfide, 1,1,2,2-tetrachloroethane (tetrachloroacetylene), chloroform, trichloroethylene, normal hexane, 1,4-dioxane, dichloromethane (dichloromethylene), methanol, methylcyclohexanone, methylcyclohexanol, cyclohexanol, styrene, acetone, ethylene glycol monomethyl ether (methyl cellosolve), butyl acetate, isobutyl acetate, isopentyl acetate (isoamyl acetate), isopropyl acetate, pentyl acetate (amyl acetate), propyl acetate, cresol, chlorobenzene, xylene, tetrachloroethylene (perchloroethylene), tetrahydrofuran, toluene, 1,1,1-trichloroethane, ethylene glycol monomethyl ether (cellosolve), ethylene glycol monomethyl ether acetate (cellosolve acetate), ethyl ether, ethylene glycol monobutyl ether (butyl cellosolve), N,N-dimethylformamide, ortho-dichlorobenzene, isobutyl alcohol, isopentyl alcohol (isoamyl alcohol), isopropyl alcohol, methyl acetate and ethyl acetate; and wherein the mixture of reactive monomers and reactive resins comprises at least one member selected from the group consisting of vinyl ester, acryl resin, acrylonitrile, methyl methacrylate, styrene monomer, n-butyl acrylate and butyl methacrylate.

13. The high specific gravity marble chips of claim 12, wherein the resin composition further comprises transparent marble chips, wherein the transparent marble chips are prepared by curing and crushing the resin composition comprising the brominated bisphenol A epoxy resin binder and the curing agent.

14. The resin composition as recited in claim 13, wherein 1 to 5 weight parts of the glycidyl ether, 1 to 50 weight parts of the non-halogenated epoxy resin, 1 to 50 weight parts of the specific-gravity-adjusting resin, 1 to 50 weight parts of the solvent and 1 to 50 weight parts of the mixture of reactive monomers and reactive resins are added on the basis of 100 weight parts of the brominated bisphenol A epoxy resin binder.

15. The high specific gravity marble chips of claim 14, wherein the resin composition further comprises a colored resin.

16. An artificial marble made from the marble chips produced using the resin composition as recited in claim 15.

* * * * *